US007469713B2

(12) United States Patent
Mackal

(10) Patent No.: US 7,469,713 B2
(45) Date of Patent: Dec. 30, 2008

(54) CHECK VALVE WITH LOCKING KEY AND PULL CORD

(75) Inventor: Glenn H. Mackal, St. Petersburg, FL (US)

(73) Assignee: Halkey-Roberts Corporation, St. Petersburg, FL (US)

( * ) Notice: Subject to any disclaimer, the term of this patent is extended or adjusted under 35 U.S.C. 154(b) by 304 days.

(21) Appl. No.: 11/514,404

(22) Filed: Aug. 29, 2006

(65) Prior Publication Data
US 2007/0051410 A1 Mar. 8, 2007

Related U.S. Application Data

(63) Continuation-in-part of application No. 10/935,937, filed on Sep. 8, 2004, now Pat. No. 7,096,884.

(51) Int. Cl.
F16K 15/18 (2006.01)
(52) U.S. Cl. .......................................... 137/522; 251/83
(58) Field of Classification Search ................. 137/522, 137/540, 543.16, 543.21; 251/82, 83, 337
See application file for complete search history.

(56) References Cited

U.S. PATENT DOCUMENTS

| 999,838 | A | * | 8/1911 | Morris | 251/83 |
| 2,449,683 | A | | 9/1948 | Akerman et al. | |
| 2,788,192 | A | * | 4/1957 | Mountford | 251/82 |
| 3,045,608 | A | * | 7/1962 | Ratterman, Jr. | 137/522 |
| 3,707,987 | A | * | 1/1973 | Gordon | 251/83 |
| 3,878,861 | A | | 4/1975 | Pareja | |
| 3,937,249 | A | | 2/1976 | Suey | |
| 3,965,916 | A | * | 6/1976 | Karas | 251/82 |
| 4,108,204 | A | | 8/1978 | Day | |
| 4,838,300 | A | | 6/1989 | Seabase | |
| 5,255,712 | A | * | 10/1993 | Foster | 137/522 |
| 5,349,984 | A | | 9/1994 | Weinheimer et al. | |
| 7,096,884 | B2 | | 8/2006 | Mackal et al. | |

* cited by examiner

Primary Examiner—John Rivell
(74) Attorney, Agent, or Firm—Holland & Knight

(57) ABSTRACT

A check valve for an inflatable device comprising a poppet urged by a conical spring to annularly seal uniformly around its entire periphery to assure more uniform cracking pressure about its entire periphery. In one embodiment the check valve comprises a locking key to lock the valve closed irrespective of the cracking pressure that may otherwise may have cracked the valve open. In another embodiment, the check valve comprises a manual dump feature that allows rapid dumping of air from the inflatable irrespective of low cracking pressure that may exist in the inflatable.

19 Claims, 12 Drawing Sheets

CHECK VALVE WITH LOCKING KEY AND PULL CORD

CROSS-REFERENCE TO RELATED APPLICATIONS

This application is a continuation-in-part of patent application Ser. No. 10/935,937, filed Sep. 8, 2004, now U.S. Pat. No. 7,096,884, the disclosure of which is hereby incorporated by reference herein.

BACKGROUND OF THE INVENTION

1. Field of the Invention

This invention relates to check valves. More particularly, this invention relates to check valves having presettable and adjustable cracking pressures.

2. Description of the Background Art

Presently, there exist many types of check valves designed to allow the flow of a fluid such as a gas in one direction but to block or "check" the flow of the fluid in the opposite direction. The amount of fluid force required to open the poppet of the valve in the un-checked direction is often referred to as the cracking pressure. Typically, the cracking pressure of a check valve is determined by the spring constant of the internal spring which constantly urges the poppet into a sealing position until unseated therefrom once the cracking pressure is attained.

A predetermined cracking pressure of a check valve is desired when check valves are used in conjunction with inflatable articles such as life vests and life rafts. Specifically, a check valve having a predetermined cracking pressure allows the inflatable to be inflated by means of a gas cartridge or the like to assure that the inflatable is inflated to a preset internal pressure. Thus, by allowing excess gas to be exhausted, over-capacity gas cartridges can be employed to inflate the inflatable to ensure that the inflatable is fully inflated to a preset internal pressure in all environments.

Whereas in some applications a preset cracking pressure is desired, in other applications it is desirable to have a check valve with a variable cracking pressure. A check valve with a variable cracking pressure may be desired, for example, in an inflatable device such as a life vest to achieve a certain amount of buoyancy or when a certain rigidity is desired. Further, in still other applications such as when transporting an inflatable, it is desirable to be able to "lock" the check valve from opening irrespective of the amount of cracking pressure in the inflatable. Finally, it may be desirable in still other applications to be able to manually open the check valve to quickly "dump" air from an inflatable. Thus, there presently exist various needs in the check valve industry for a check valves with fixed cracking pressures, with variable cracking pressures, with a locking feature and/or with a dumping feature.

Therefore, it is an object of this invention to provide an improvement which overcomes the aforementioned inadequacies of the prior art devices and provides an improvement which is a significant contribution to the advancement of the check valve art.

Another object of this invention is to provide a check valve having an increased flow rate.

Another object of this invention is to provide a check valve having a structure composed of a minimal number of parts to increase its reliability while decreasing cost of manufacture and assembly.

Another object of this invention is to provide a check valve having a design that equalizes the sealing force of the poppet around its entire periphery to assure that the check valve is cracked uniformly about the periphery of the poppet.

Another object of this invention is to provide a check valve with a fixed cracking pressure.

Another object of this invention is to provide a check valve with a with a variable cracking pressure.

Another object of this invention is to provide a check valve with a locking feature to prevent cracking of the check valve irrespective of the pressure exerted that would otherwise crack valve open.

Another object of this invention is to provide a check valve with a manual dumping feature that allows the valve to be manually cracked open.

The foregoing has outlined some of the pertinent objects of the invention. These objects should be construed to be merely illustrative of some of the more prominent features and applications of the intended invention. Many other beneficial results can be attained by applying the disclosed invention in a different manner or modifying the invention within the scope of the disclosure. Accordingly, other objects and a fuller understanding of the invention may be had by referring to the summary of the invention and the detailed description of the preferred embodiment in addition to the scope of the invention defined by the claims taken in conjunction with the accompanying drawings.

SUMMARY OF THE INVENTION

For the purpose of summarizing this invention, this invention comprises a check valve having a simple design with fewer parts than conventional prior art check valves to achieve increased reliability while reducing manufacturing and assembly costs. The check valve of the invention further achieves an increased flow rate upon cracking due to its simplistic yet ingenious design.

Finally, the poppet of the check valve of the invention cooperates with a conical spring to assure that it seals uniformly around its entire periphery facilitating more uniform cracking pressure about its entire periphery.

In another embodiment of the check valve of the invention, the cracking pressure is adjustable by means of a threaded adjustable plate which cooperates with the conical spring to reduce the length thereof and thereby increase the amount of force exerted by the spring onto the poppet into sealing engagement, thereby increasing the cracking pressure.

In still another embodiment, the check valve of the invention comprises a removable locking key that engages the poppet to preclude it from cracking open irrespective of the cracking pressure exerted on it that would otherwise crack the valve open.

In a further embodiment, the check valve of the invention comprises a manual dump plate including a tether with a pull handle coupled to the spring that cracks the poppet open by releasing the spring force that otherwise would force it closed, thereby unseating it from its seat upon pulling of the handle of the tether. The manual dump plate allows manual cracking of the valve open to dump the air from the inflatable device irrespective of low cracking pressure in the inflatable that would otherwise be insufficient to crack the valve open.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION OF THE PREFERRED EMBODIMENT

Figure 1:
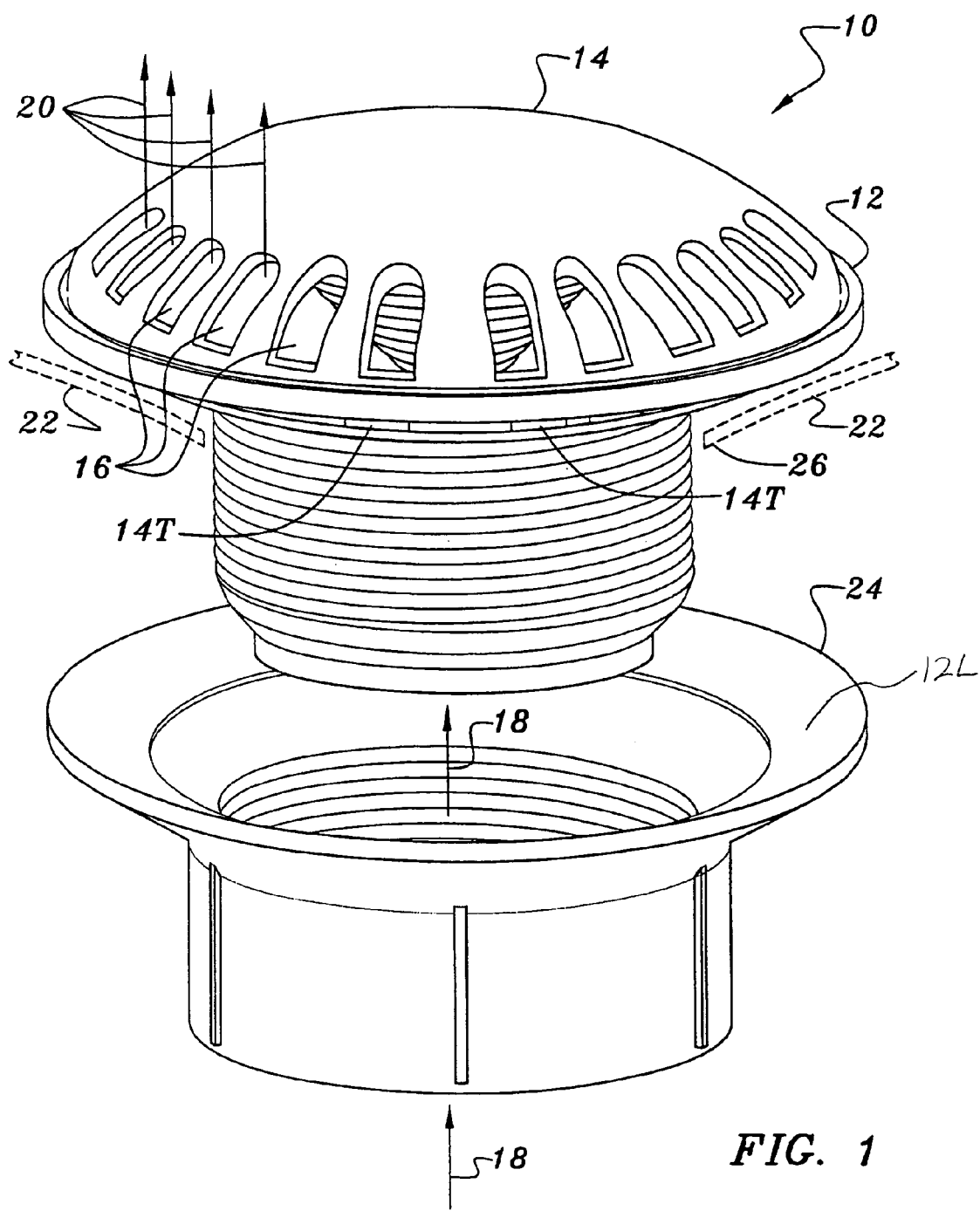
FIG. 1 is a perspective view of the first embodiment of the check valve of the invention.

In one embodiment, the check valve 10 of the invention comprises a body 12 having an upper body 12U and a lower body 12L threadably coupled together by complementary respective threads 12T. A cap 14 is coupled to the upper body 12U. Cap 15 comprises a plurality of flow openings 16 about its periphery allowing internal fluid such as air to flow in the direction of arrows 18 through the body 12 to then be exhausted from the check valve 10 via openings 16 as shown by arrows 20.

Body 12 may be connected about an opening in an inflatable, shown in phantom by reference numeral 22, through the use of a complementary flanges 24 of the upper and lower bodies 12U and 12L that sealingly capture the edge 26 of the opening in the inflatable 22 as the bodies 12U and 12L are tightly threaded together. Alternatively, the lower body 12L may comprise a heat-sealable flange 24 that is sealed about the edge 26 of the opening in the inflatable 22. Representative heat-sealable flanges are disclosed in U.S. Pat. Nos. 2,219, 190, 4,015,622, 4,927,397 and 6,009,895, the disclosures of each of which are hereby incorporated by reference herein.

Figure 2:
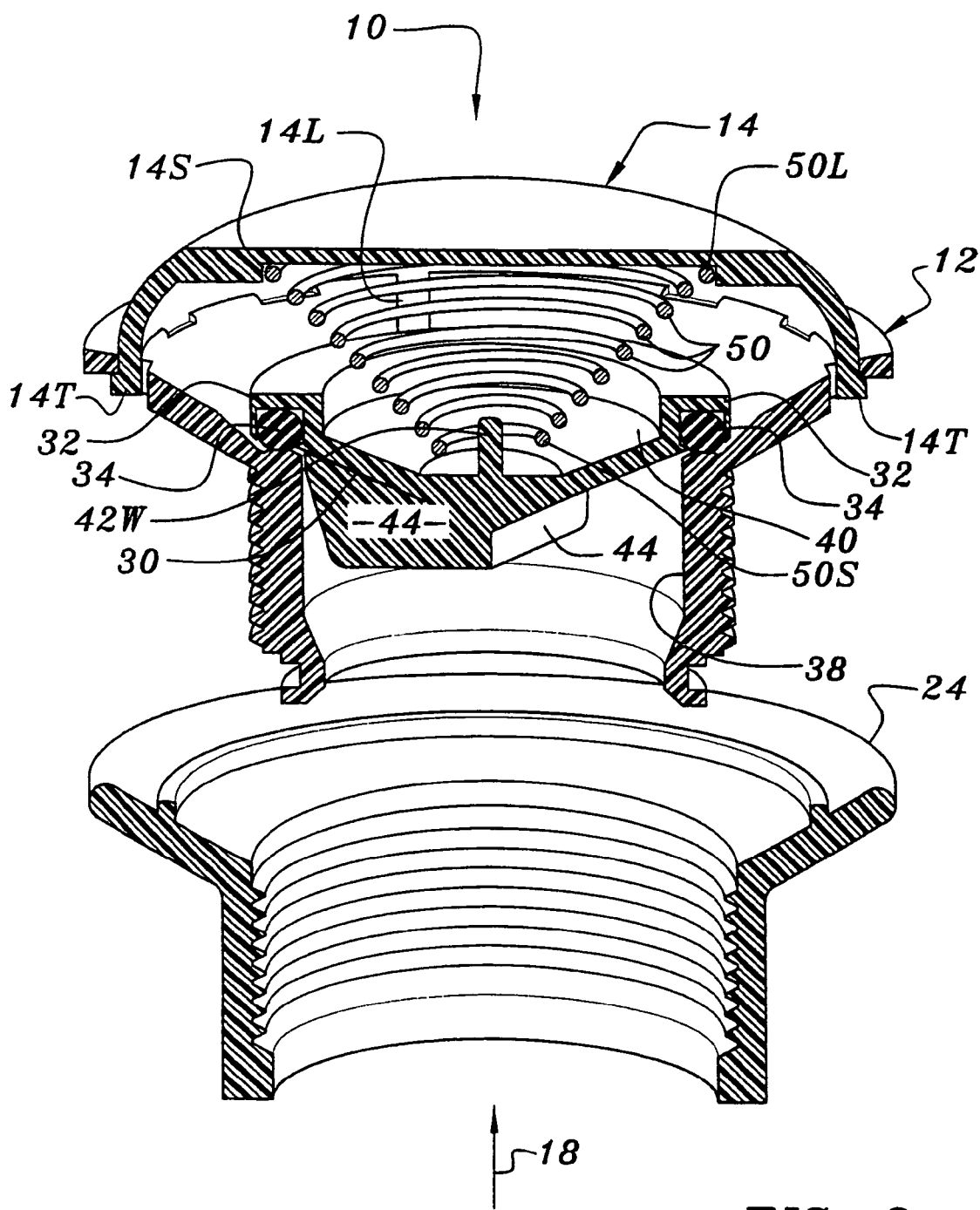
FIG. 2 is a perspective view, partially cut-away, of the first embodiment of the invention.
Figure 3:
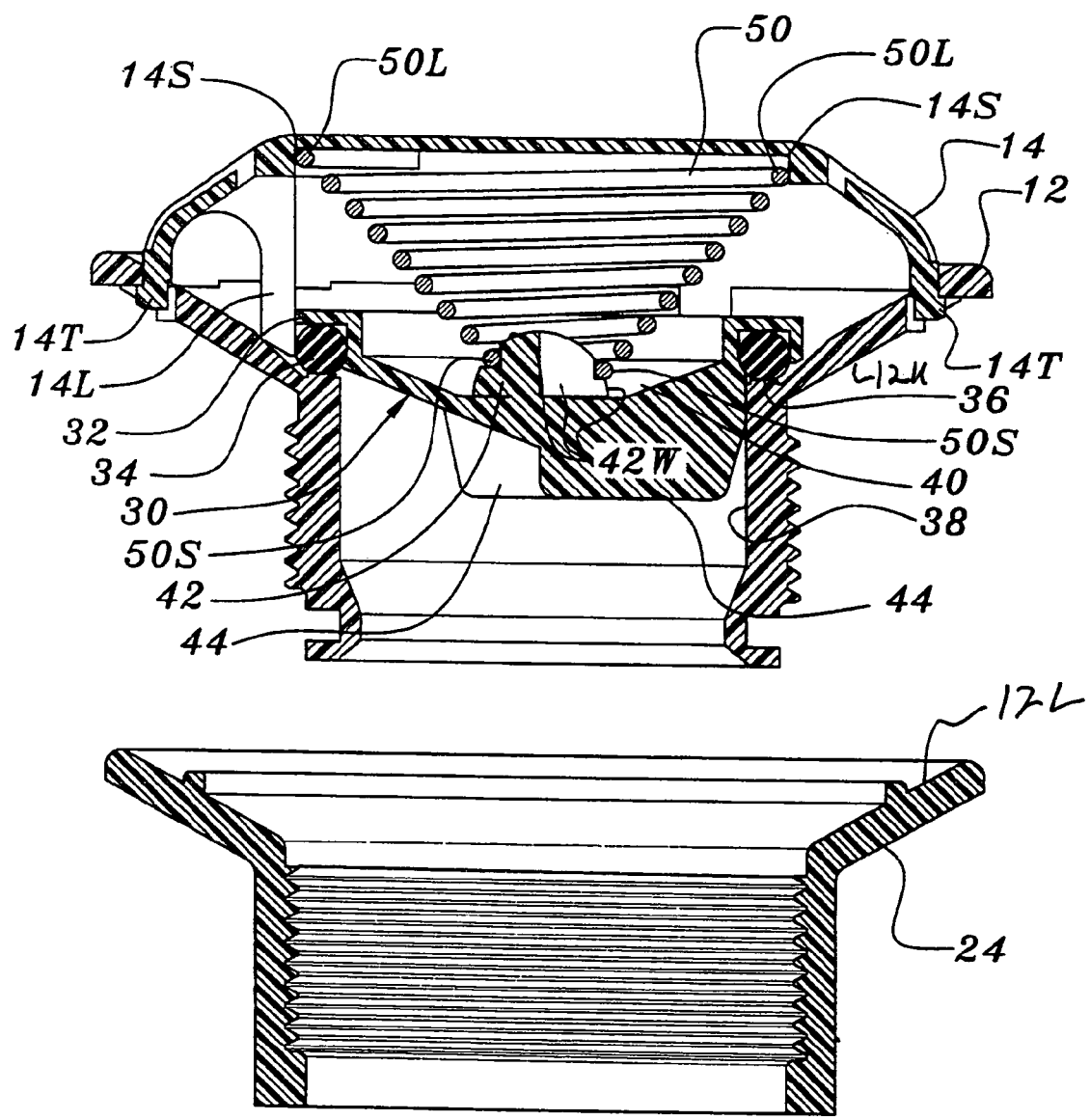
FIG. 3 is a diametrical cross-sectional view of the first embodiment of the invention.

As shown in FIGS. 2 and 3, check valve 10 of the invention comprises a poppet 30 having an annular groove 32 in which is positioned an annular O-ring 34 that seats on an annular seat 36 formed at the end of the lumen 38 of the upper body 12U.

The poppet 30 includes a generally concave portion 46 having an upstanding protrusion 42 extending from the inside center thereof. Protrusion 42 comprises four interior webs 42W positioned at 90 degree intervals and forming a semi-spherical outer configuration. Poppet 30 further comprises three exterior webs 44 positioned at 120 degree intervals and being slightly tapered inwardly from the lumen 38 of the body 12.

Cap 14 comprises a plurality of tabs 14T that snap into corresponding slots formed in the outer periphery of the cap 12 to securely retain the cap 14 into position. Cap 14 further comprises a plurality of downwardly extending legs 14L, such as three positioned at 120 degree intervals, to entrain and center the poppet 30 therebetween. The legs 14L coupled with the exterior webs 44 assure that the poppet 30 may reciprocate upwardly within cap 14 without tilting sideways out of alignment where it might otherwise potentially jam.

Finally, the check valve 10 of the invention comprises a conical spring 50 having its uppermost largest diameter coil 50L captured by an annular step 14S formed in the underside of the cap 14. The lowermost smallest diameter coil 50S is dimensioned to be appreciably less in diameter than the outer diameter of the protrusion 42 such that when the coil 50S is seated thereon, poppet 30 is allowed to pivot universally in all directions. The ability of the poppet 30 to pivot universally by virtue of the protrusion 42 pivoting within the coil 50S, assures that the O-ring 34 of the poppet 30 will be forced into sealing engagement with the annular seat 36 in a highly uniform manner about its entire periphery. Consequently, uniform cracking of the poppet 30 about its entire periphery is achieved.

Figure 4:
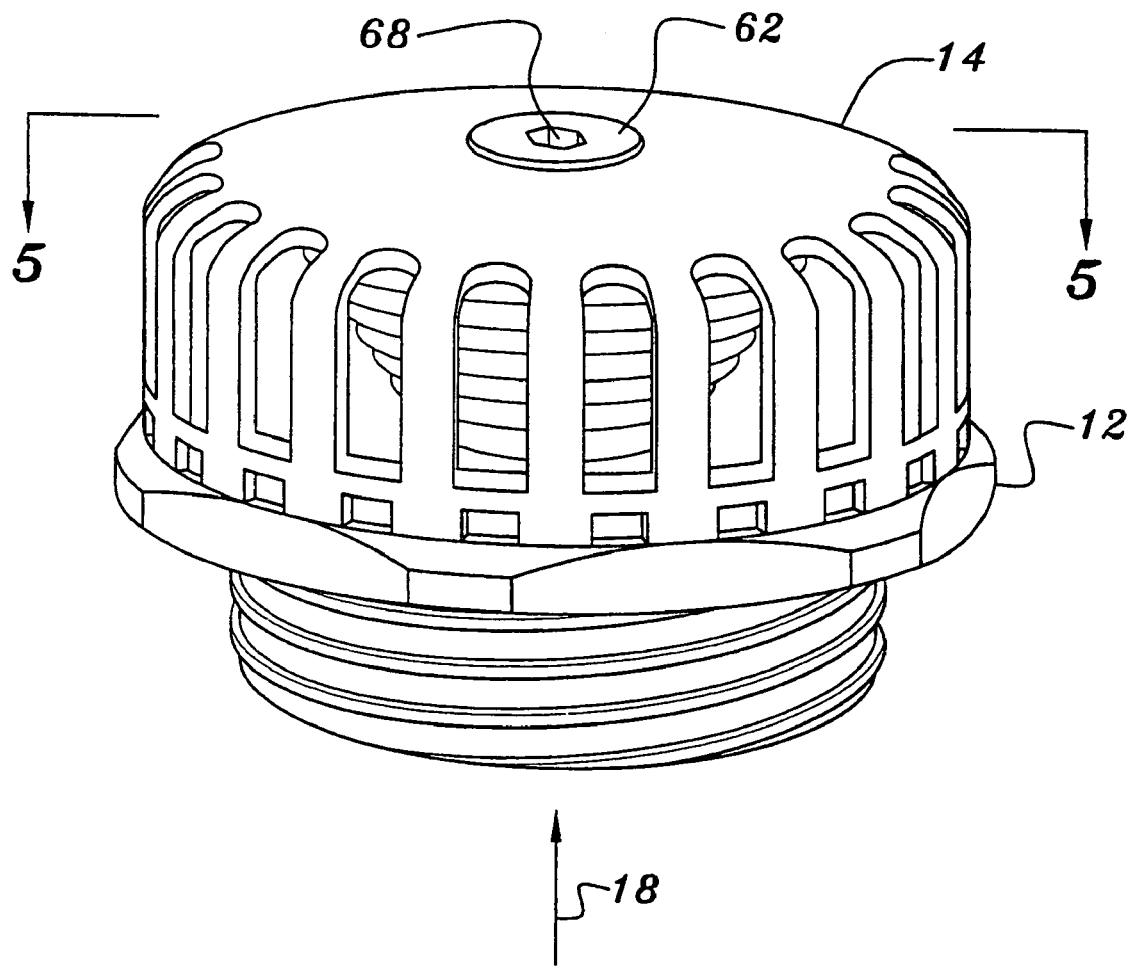
FIG. 4 is a perspective view of the second embodiment of the check valve of the invention.
Figure 5:
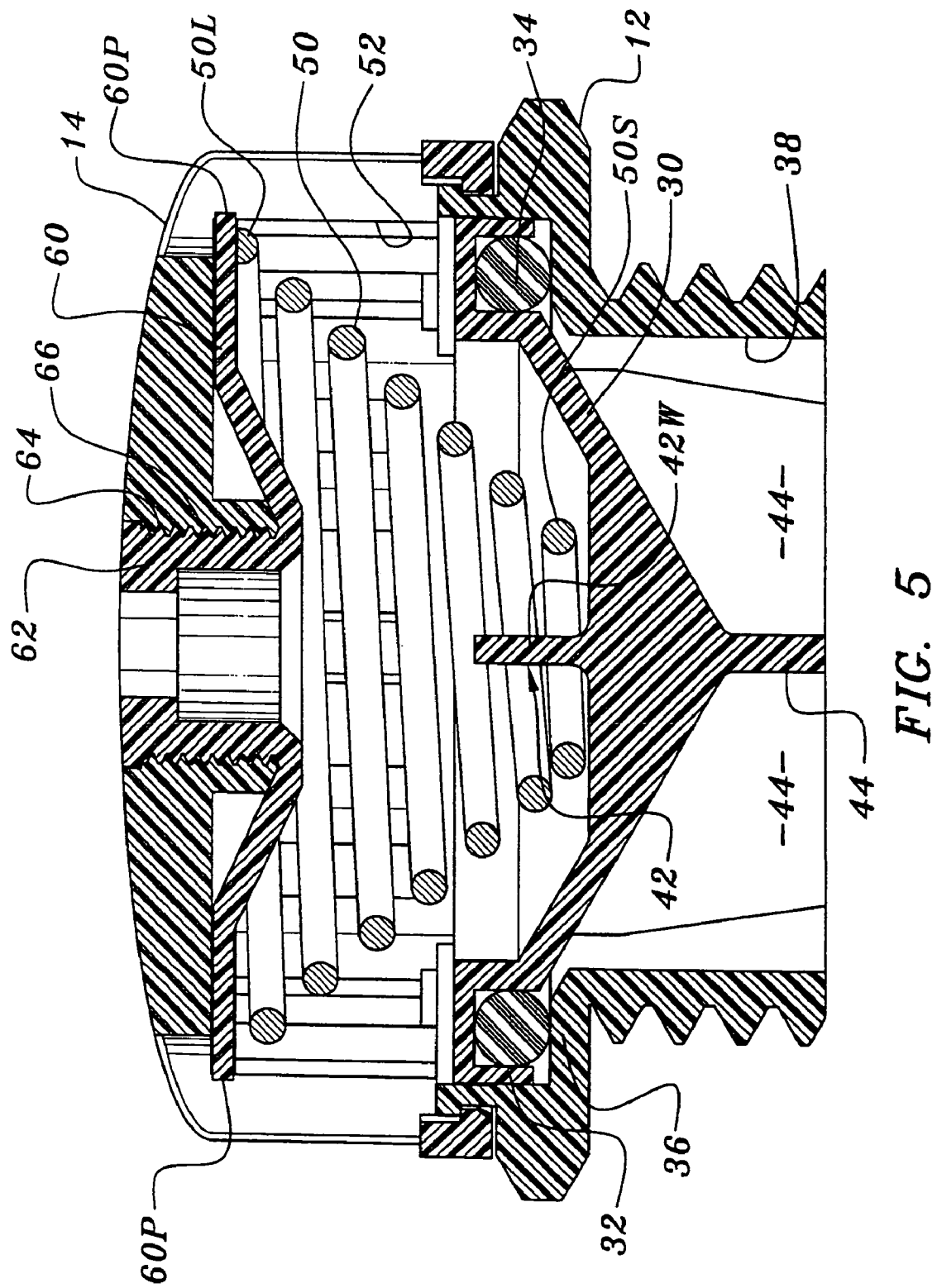
FIG. 5 is a diametrical cross-sectional view of FIG. 5 along lines 5-5.

Referring now to FIGS. 4 and 5, the second embodiment of the check valve 10 of the invention comprises a similar body 12 with a cap 14 having flow openings 20 allowing fluid flow 18 to flow through the valve 10 in the unchecked flow direction. Similarly, the second embodiment of the check valve 10 of the invention comprises a conical spring 50 entrained between the cap 14 and a poppet 30 to urge its O-ring 34 in sealing engagement with the annular seat 36.

The poppet 30 further includes exterior webs 44 which prevent the poppet from becoming canted with the lumen 38. However, due to the specific configuration of the cap 14, in the second embodiment, the downward depending legs 14L of the cap 14 of the first embodiment need not be included since the annular groove 32 moves in alignment with the lumen 52 of the cap 14.

In the second embodiment, poppet 30 similarly includes an upstanding center protrusion 42 with four webs 42W forming an outer semi-spherical configuration on which is seated the lowermost smaller diameter coil 50S of the spring 50.

Unlike the first embodiment, the second embodiment of the check valve 10 comprises an adjustable plate 60 having a center boss 62 with external threads 64 for threaded engagement with a threaded hole 66 formed in the center of the cap 14. Boss 62 may be provided with a hex indentation 63 for receiving a hex or other tool.

Plate 60 extends in a somewhat planar configuration from the boss 62 to a position between the uppermost larger diameter spring coil 50L and the underside of cap 14. Upon rotation of the boss 62 in a clockwise direction, plate 60 is caused to move inwardly to further compress the conical spring and thereby increase the cracking pressure of the check valve 10. The outer periphery of the plate 60 may be provided with radial protuberances 60P to engage into openings 20 and provide indexing of the plate 60 as the plate 60 is rotated to adjust the cracking pressure. The protuberances 60P may be of the same width as the openings 20 or, if smaller, may be asymmetrically positioned to provide accurate indexing.

Figure 6:
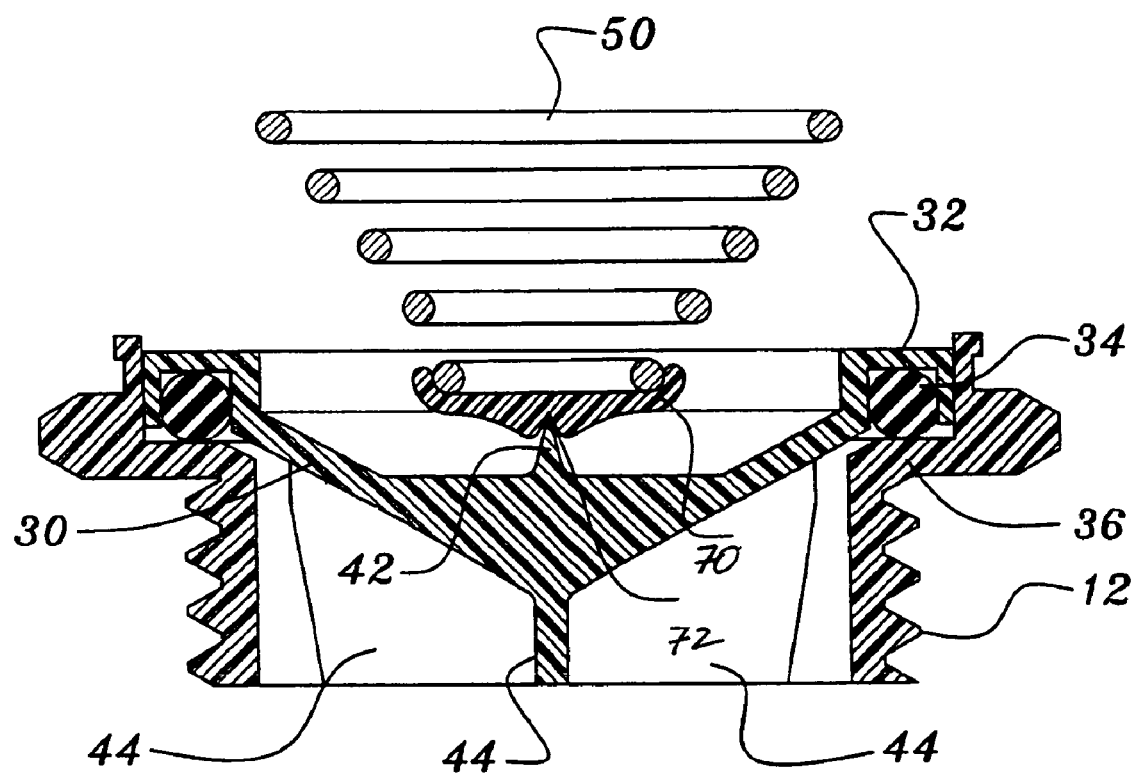
FIG. 6 is a partial diametrical cross-sectional view of the second embodiment but with an alternative manner for centering the conical spring to assure uniform sealing of the poppet.
Figure 7A:
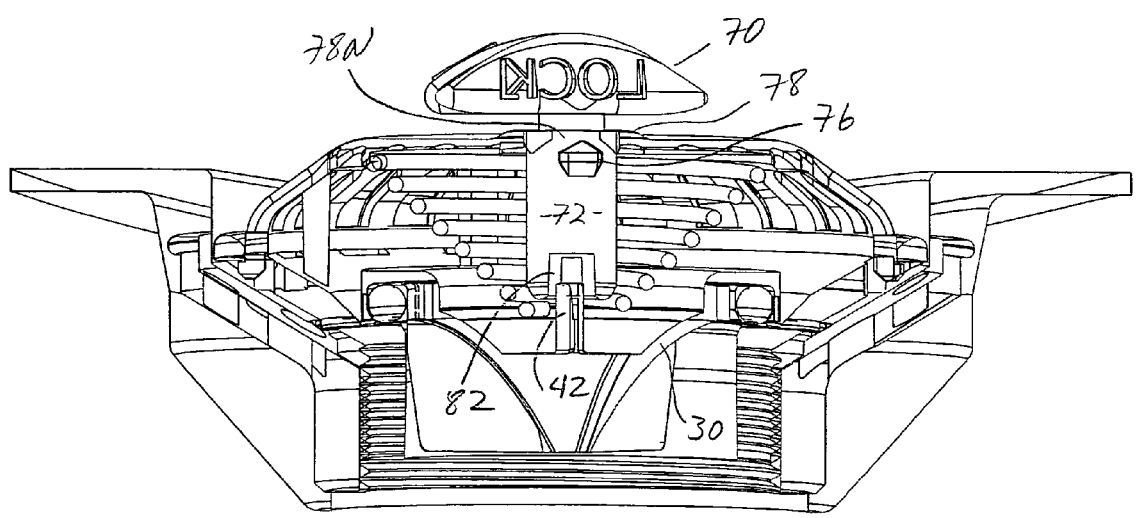
FIG. 7A is a diametrical cross-sectional view of the check valve of the invention having a locking key to lock the valve closed and prevent it from opening irrespective of the cracking pressure exerted on it.
Figure 7B:
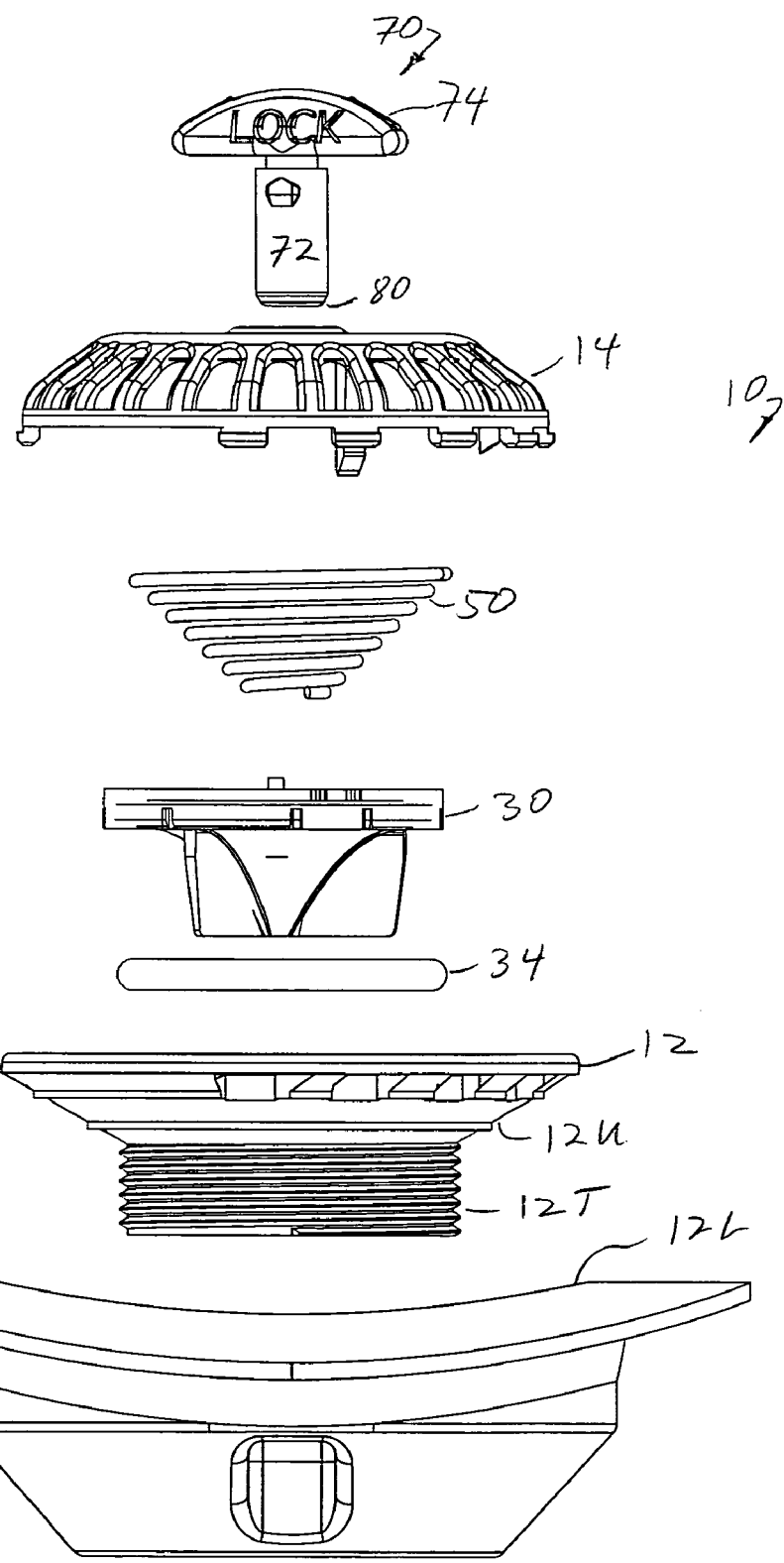
FIG. 7B is an exploded view of FIG. 7A.
Figure 7C:
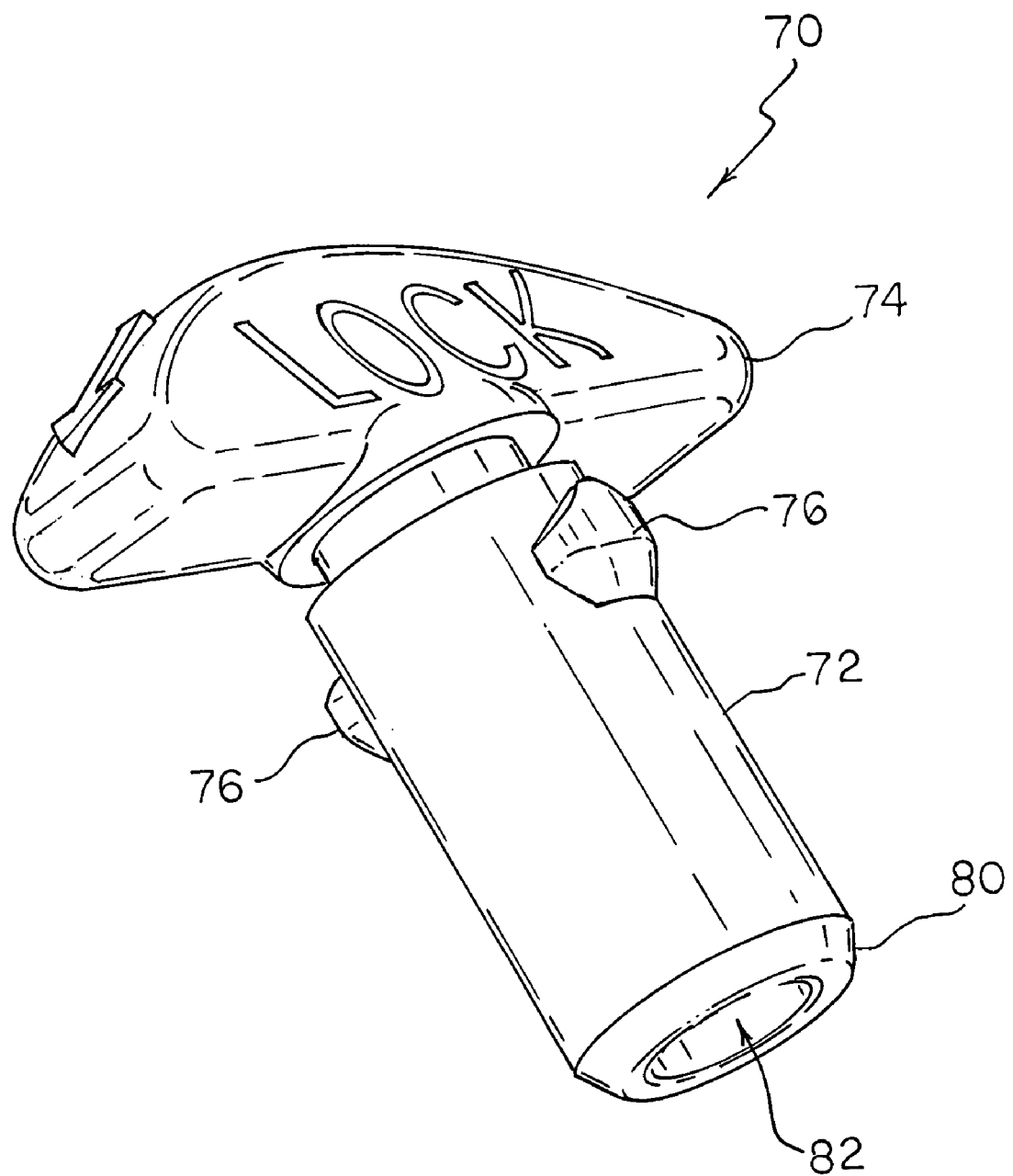
FIG. 7C is a perspective view of the locking key of FIG. 7A.
Figure 7D:
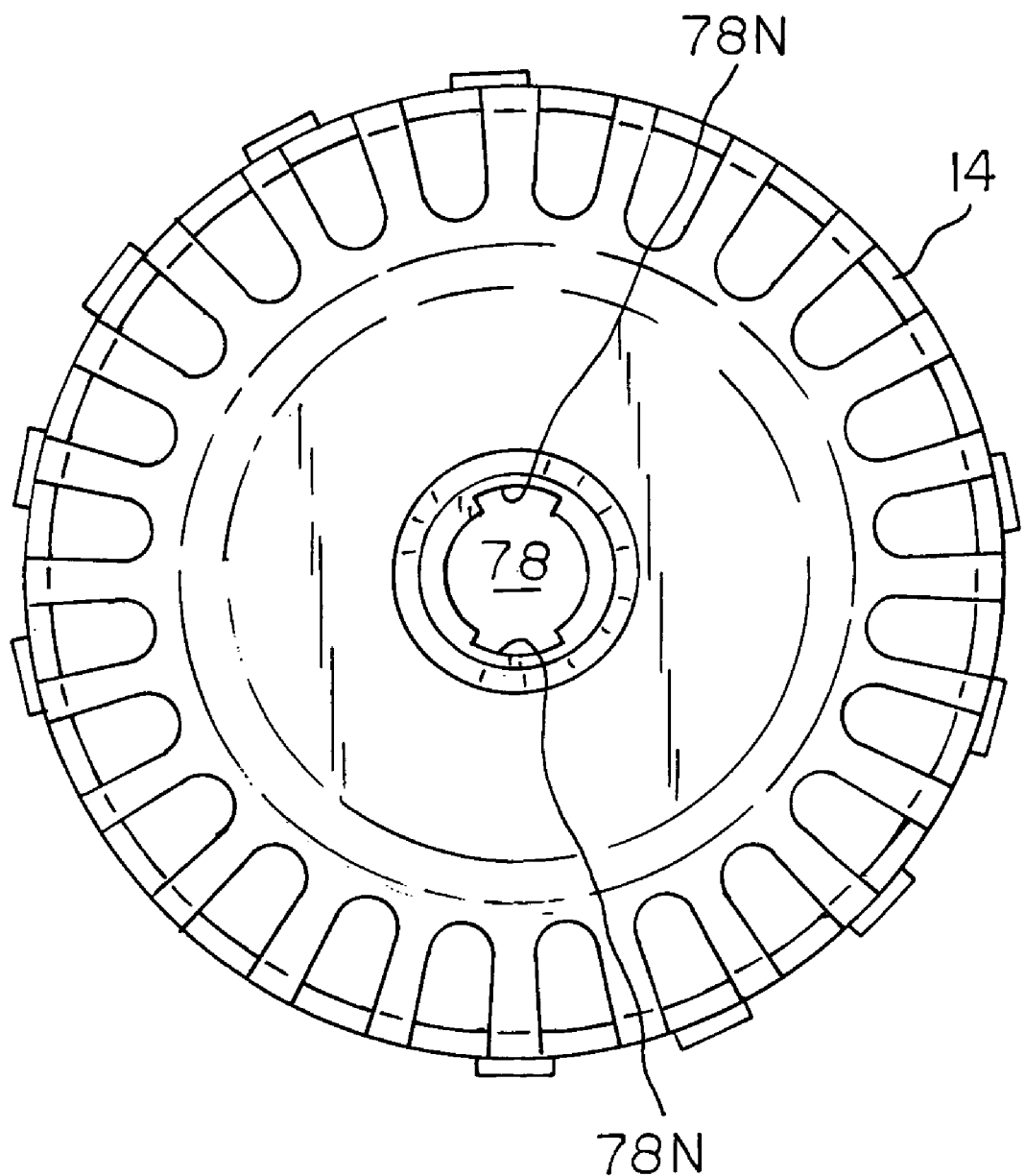
FIG. 7D is a top plan view of the cap showing the notches formed in the slotted hole that receives the locking key.

FIG. 6 illustrates an alternative embodiment for free-floating of the poppet 30 to assure uniform annular indexing of its O-ring 34 on annular seat 36. Specifically, protrusion 42 is configured to achieve a conical apex point for universal engagement into a corresponding center seat 72 formed in a balance plate 70. The balance plate 70 assures that only a central force is exerted onto the poppet 30 thereby achieving uniform annular sealing.

The various views of FIG. 7 illustrate the check valve 10 of the invention incorporating a locking key 70 for fixedly locking the poppet 30 in its sealed, closed position seated on the annular seat 36 to thereby prevent the poppet 30 from cracking open irrespective of the internal pressure that would otherwise crack the poppet 30 against the force of the spring 50.

The locking key 70 comprises a generally circular cylindrical neck portion 72 and handle portion 74, preferably integrally formed together such as by injection molding. The neck portion 72 of the locking key 70 is designed to fit within a slotted hole 78 formed in the center of the cap 14 (see FIG. 7D) to engage the center protrusion of the poppet 30 and then held from any upward movement by manually turning the neck portion 72 via its handle portion 74, thereby fixedly locking the poppet 30 into its closed position.

More particularly, the neck portion 72 comprises one or more locking protrusions 76 extending radially outward from the surface of its neck portion 72 in axial alignment with respective slotted notch(es) 78N formed in the edge of the slotted hole 78. Preferably, two notches 78N are diametrically positioned across the hole 78 to form opposing notches 78N. Likewise, preferably the locking protrusions 76 are correspondingly diametrically opposed on the neck portion 72 to thereby respectively fit into the opposing notches 78N of the slotted hole 78.

It should therefore be evident that the outer diameter of the neck portion 72 is appreciably less than the inner diameter of a slotted hole 78 to fit therein whereas the outer diameter of the opposing protrusions 76 is appreciably less that the inner distance between the opposing notches 78N.

Once the neck portion 72 is inserted into the hole 78 and turned approximately 90 degrees, the locking protrusions 76 move from within the notches 78N to the underside of the cap 14 about the periphery of the hole 78. In this locked position, the neck portion 72 is locked in place and is prevented from any further axial movement relative to the hole 78.

The handle portion 74 preferably comprises a comfortable grip for a person's thumb and forefinger thereby facilitating insertion of the locking key into the hole 78 and then turning of the locking key 70 to fixedly lock it in the hole 78. One comfortable grip may comprise a generally flat tapered design with a rounded top edge that is comfortable to grip by a person's thumb and forefinger. Further, the handle portion 74 may be marked with appropriate directional arrows to urge insertion and corresponding legends such as "LOCK".

The bottom end 80 of the neck portion 72 of the locking key preferably comprises a shallow axial blind hole 82 of a diameter sufficient to receive the upstanding protrusion 42 of the poppet 30 therein. Correspondingly, the length of the neck portion 72 preferably comprises a length sufficient to engage and exert a slight force onto the upstanding poppet protrusion 42 as the key 70 is inserted into the hole 78 and locked by twisting. Correspondingly, since the upstanding protrusion 42 is now locked from any further axial movement, the poppet 30 is locked in its seated potion on the annular seat 36 and the valve 10 is fixedly locked closed and cannot open irrespective of the cracking pressure that may be exerted on it.

The locking key 70 may be removed by rotating it via its handle portion 74 until the locking protrusions 76 are again aligned with the notches 78N whereupon the key 70 may be removed from the hole 78 altogether.

Referring now to FIG. 8, the check valve 10 of the invention may include a manual dump feature that allows manual cracking of the valve open to dump the air from the inflatable device irrespective of low cracking pressure in the inflatable that would otherwise be insufficient to crack the valve open.

Figure 8A:
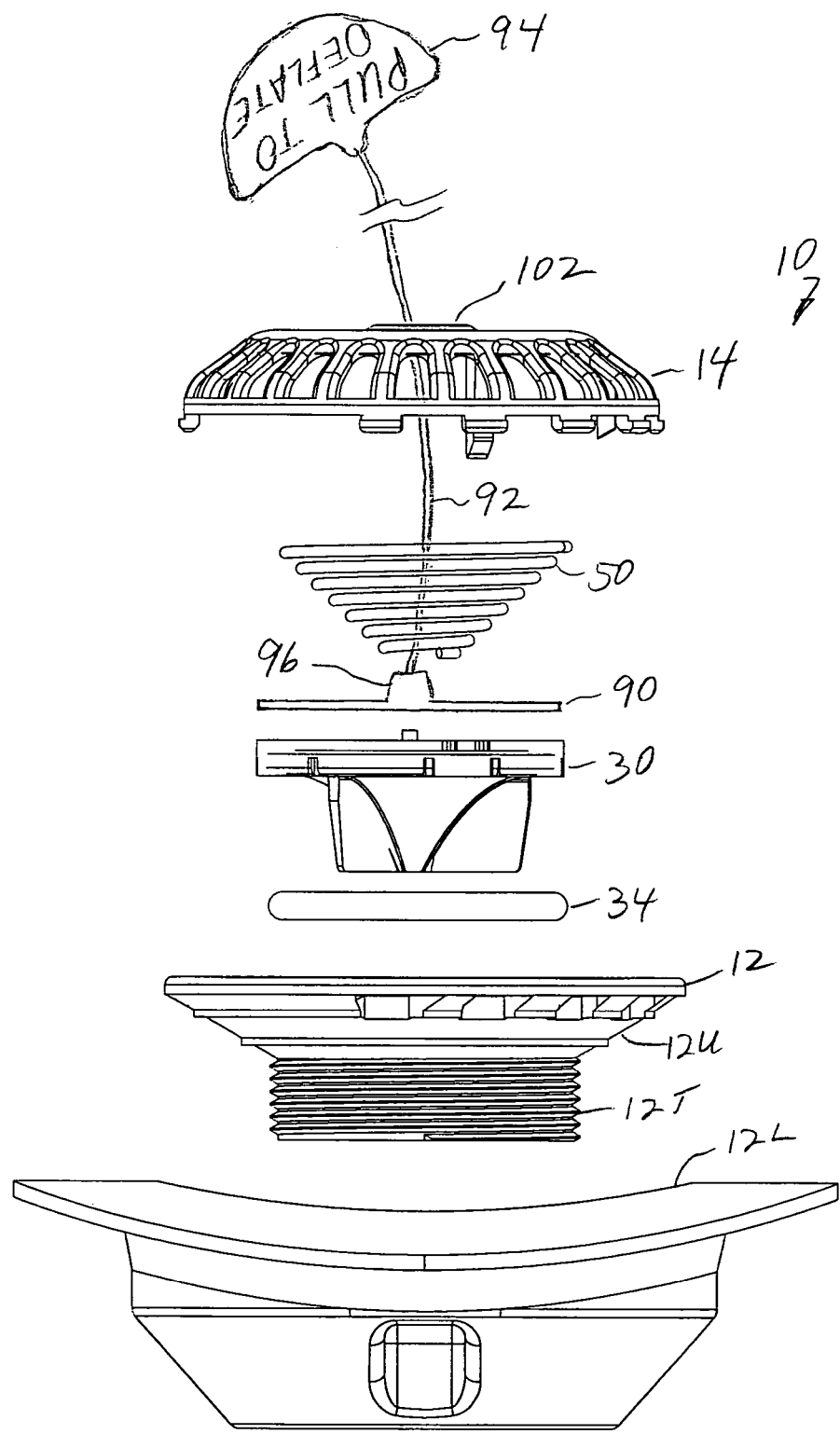
FIG. 8A is an exploded view of the check valve of the invention having a manual dump plate to allow opening of the poppet of the valve irrespective of the cracking pressure exerted on it thereby allowing the dumping of air in the inflatable to which the valve is installed.
Figure 8B:
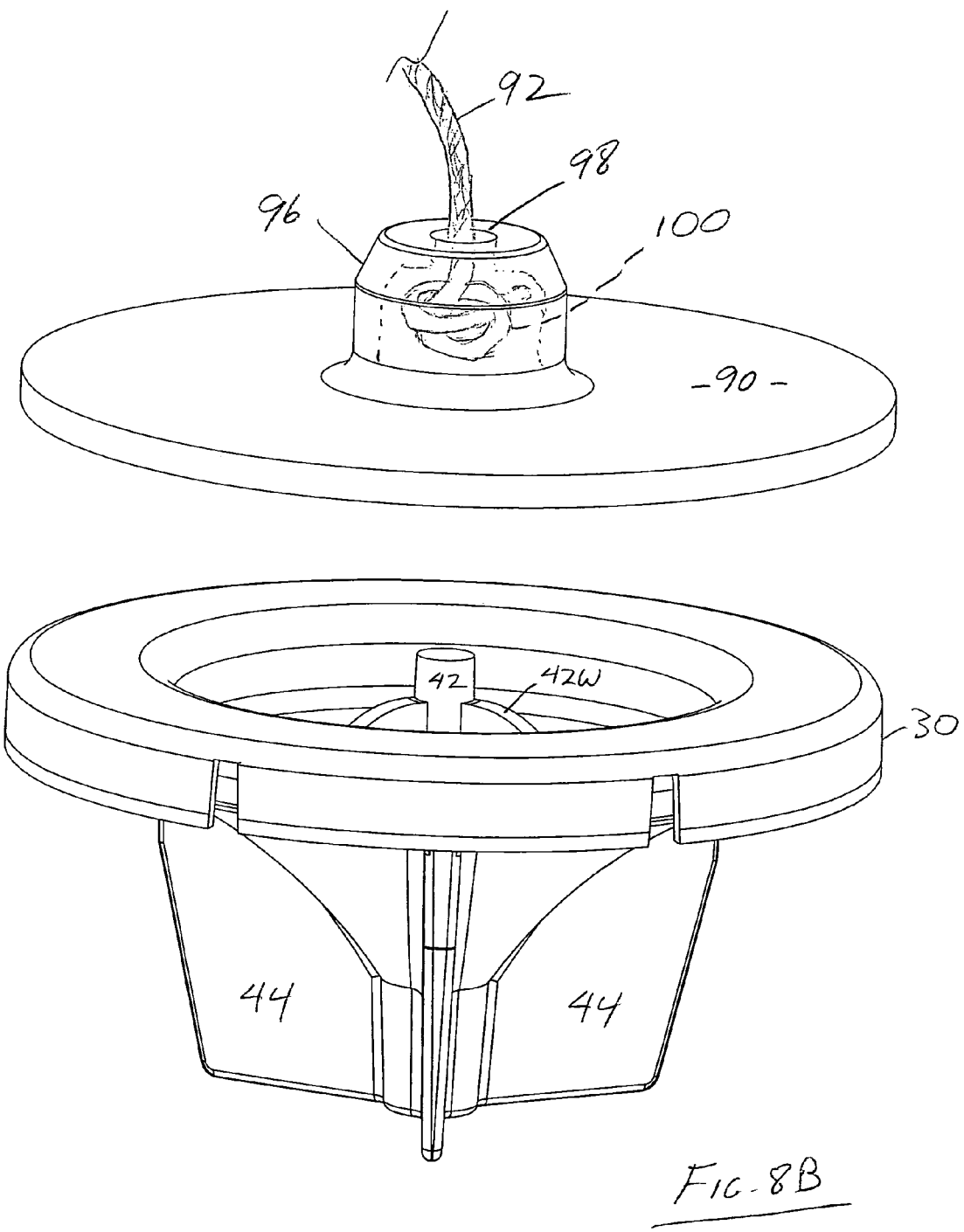
FIG. 8B is an exploded perspective view of the manual dump plate and poppet.

More specifically, as shown in FIGS. 8A and 8B, the manual dump feature comprises a dump plate 90 including a tether 92 with a pull handle 94. The dump plate 90 comprises a thin disk-shaped configuration with a hollow center boss 96 having a center hole 98. The tether 92 is coupled to the dump plate 90 by threading it through the center hole 98 and tying a knot 100 in its end. After tying the knot and pulling the tether 92, the knot 100 is pulled into the hollow center boss 96.

As shown in FIG. 8A, during assembly, the dump plate 90 is positioned between the poppet 30 and the spring 50, with the tether 92 extending through the center of the spring 50 and then through a center hole 102 in the cap 14. The pull handle 94 is then fixedly connected to the end of the tether 92.

Upon pulling of the pull handle 92, an upward force is exerted onto the dump plate 90 which in turn causes the spring 50 to compress between the underside of the cap 14 and the dump plate 90. Once the spring is compressed, it no longer exerts any force on the poppet 30. The poppet 30 is therefore is unseated from its annular seat 36 (i.e., it is free floating). The inflatable is therefore "dumped" of any air since any air pressure within the inflatable is sufficient to move the poppet 30 significantly upwardly to allow such air to freely escape through the check valve 10.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

Now that the invention has been described,

What is claimed is:

1. A check valve comprising in combination:
   a body;
   a cap affixed to said body;
   a poppet positioned within said body, said poppet having an annular sealing member for annular sealing engagement with a seat formed within said body, said poppet further including a center protrusion extending interiorly therefrom;
   a conical spring entrained between said cap and said protrusion;
   a locking key for locking said poppet into said sealing engagement with said seat irrespective of cracking pressure that might otherwise crack the valve open.

2. The check valve as set forth in claim 1, wherein said locking key comprises a neck portion configured to lockingly engage into a hole in said cap.

3. The check valve as set forth in claim 2, wherein said neck portion comprises at least one protrusion that engages through a notch in an edge of said hole and then under another edge of said hole upon turning to lock said neck portion from any axial movement.

4. The check valve as set forth in claim 3, wherein said neck portion comprises a length such that when said neck portion is locked from any axial movement, a bottom end thereof engages said poppet to lock said poppet from any axial movement.

5. The check valve as set forth in claim 4, wherein said bottom end comprises a hole for receiving an upstanding protrusion of said poppet.

6. The check valve as set forth in claim 5, wherein said cap comprises a plurality of flow openings about its periphery allowing fluid to flow through said body to then be exhausted from the check valve.

7. The check valve as set forth in claim 6, wherein said body is connected about an opening in an inflatable through the use of a threaded flange that sealingly captures an edge of said opening in said inflatable.

8. The check valve as set forth in claim 6, wherein said poppet includes an annular groove in which is positioned an annular sealing member.

9. The check valve as set forth in claim 6, wherein said poppet comprises a concave portion from which said upstanding protrusion extends.

10. The check valve as set forth in claim 6, wherein said upstanding protrusion comprises interior webs forming a semi-spherical outer configuration.

11. The check valve as set forth in claim 6, wherein said poppet comprises exterior webs, slightly tapered inwardly, from a lumen of said body.

12. The check valve as set forth in claim 6, wherein said conical spring includes an uppermost largest diameter coil captured by an annular step formed in the underside of the cap.

13. The check valve as set forth in claim 6, wherein said conical spring includes a lowermost smallest diameter coil dimensioned to be appreciably less in diameter than an outer diameter of said center protrusion such that when said coil spring is seated thereon, said poppet is allowed to pivot universally in all directions.

14. A check valve comprising in combination: a body; a cap affixed to said body, said cap comprising a plurality of flow openings about its periphery, allowing fluid to flow through said body to then be exhausted from the check valve;

a poppet positioned within said body; a spring entrained between said cap and said poppet; and a tethered dump plate positioned between said poppet and said conical spring for disengaging said spring from said poppet.

15. The check valve as set forth in claim 14, wherein said tethered dump plate comprises a tether coupled to a disk-shaped plate.

16. The check valve as set forth in claim 15, wherein said tether extends from said disk-shaped plate through said spring and exits the check valve through a hole in said cap.

17. The check valve as set forth in claim 16, wherein said tether is coupled to a boss of said disk-shaped plate.

18. The check valve as set forth in claim 17, wherein said tether comprises a knotted end that fits into said boss.

19. The check valve as set forth in claim 18, wherein said tethered dump plate further includes a pull handle.

* * * * *